United States Patent [19]

Van Loo et al.

[11] Patent Number: 4,906,427
[45] Date of Patent: Mar. 6, 1990

[54] ASSEMBLY FOR COVERING AN OBJECT

[75] Inventors: Robert H. Van Loo, Linden, Belgium; Johannes M. Cordia, Portola Valley, Calif.

[73] Assignee: NV Raychem SA, Kessel-lo, Belgium

[21] Appl. No.: 70,984

[22] Filed: Jul. 8, 1987

Related U.S. Application Data

[63] Continuation-in-part of Ser. No. 24,285, Mar. 10, 1987, abandoned.

[30] Foreign Application Priority Data

Mar. 26, 1986 [GB] United Kingdom ............... 8607577
May 27, 1986 [GB] United Kingdom ............... 8612820

[51] Int. Cl.$^4$ .............................................. B32B 31/26
[52] U.S. Cl. ..................................... 264/229; 156/85;
156/86; 264/230; 264/342 K; 174/DIG. 8
[58] Field of Search ............. 156/85, 86; 174/DIG. 8;
219/528, 529, 535, 544; 264/229, 230, 342 R

[56] References Cited

U.S. PATENT DOCUMENTS

| 4,200,676 | 4/1980 | Caponigro et al. ............... 156/86 |
| 4,323,607 | 4/1982 | Nishimura et al. ........... 174/DIG. 8 |
| 4,428,789 | 1/1984 | Masaaki et al. .................... 156/86 |
| 4,517,234 | 5/1985 | Fisher ............................ 174/DIG. 8 |
| 4,532,168 | 7/1985 | Steele et al. ................... 174/DIG. 8 |

FOREIGN PATENT DOCUMENTS

| 0150377 | 11/1984 | European Pat. Off. . |
| 0141675 | 5/1985 | European Pat. Off. . |
| 0158519 | 10/1985 | European Pat. Off. . |
| 8018519 | 6/1981 | Fed. Rep. of Germany . |
| 1155470 | 6/1969 | United Kingdom . |
| 1588721 | 4/1981 | United Kingdom . |
| 2133740 | 8/1986 | United Kingdom . |
| 2139142 | 9/1986 | United Kingdom . |
| 2135632 | 3/1987 | United Kingdom . |
| 2134334 | 7/1987 | United Kingdom . |
| 2135836 | 9/1987 | United Kingdom . |
| 2133639 | 10/1987 | United Kingdom . |

Primary Examiner—Caleb Weston
Attorney, Agent, or Firm—Edith A. Rice; Herbert G. Burkard

[57] ABSTRACT

The assembly comprises a wraparound heat recoverable sleeve, and a resilient girdle provided with means for fastening opposed edge regions thereof together, thereby enabling the girdle to hold the sleeve in its wrapped configuration during recovery.

The girdle is particularly suitable for use with sleeves that are wrapped around an object more than once.

9 Claims, 2 Drawing Sheets

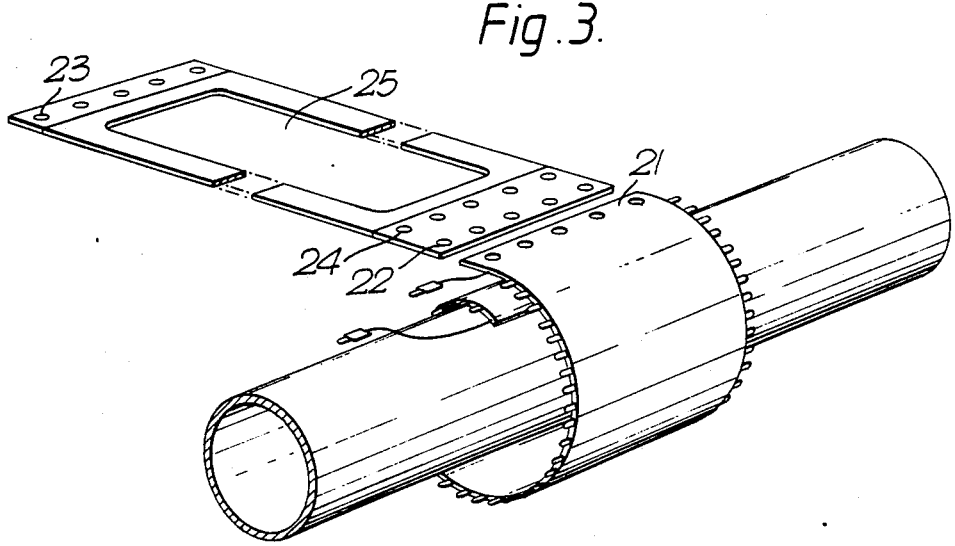
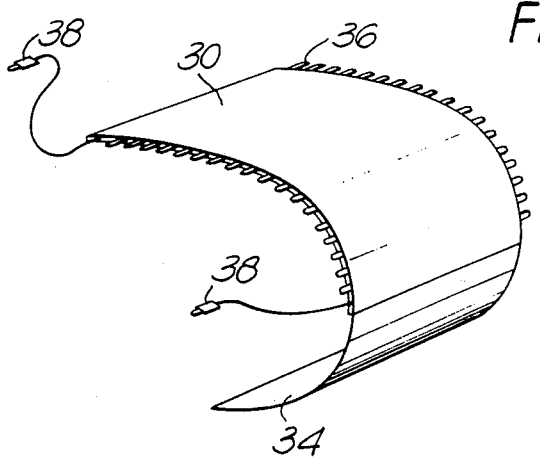
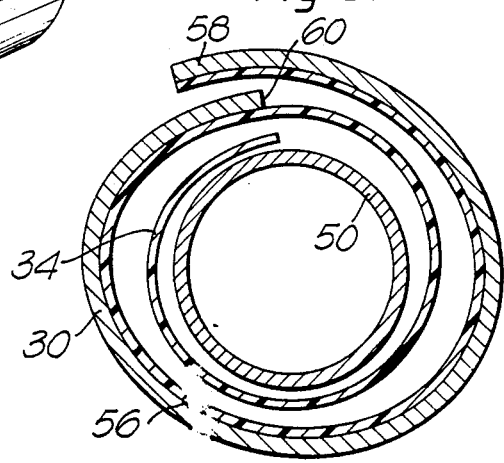

ASSEMBLY FOR COVERING AN OBJECT

This application is a continuation-in-part of application Ser. No. 024,285 filed March 10, 1987, now abandoned, the disclosure of which is incorporated herein by reference.

The present invention relates to an assembly for covering an object, the assembly comprising a wrap-around sleeve, particularly a sleeve that is dimensionally recoverable.

A dimensionally recoverable article is one whose dimensional configuration may be made to change when subjected to an appropriate treatment. Usually such articles recover towards an original shape from which they have previously been deformed but the term "recoverable", as used herein, is also applicable to an article which, on recovery, adopts a new configuration even if it has not previously been deformed.

It is preferred to use sleeves that are recoverable by the action of heat. In their most common form, heat-recoverable sleeves comprise polymeric material exhibiting the property of elastic or plastic memory, as described in U.S. Pat. No. 2,027,962, U.S. Pat. No. 3,086,242 and U.S. Pat. No. 3,597,372, for example, As is made clear in U.S. Pat. No. 2,027,962, for example, the original dimensionally heat stable form may be a transient form in a continuous process in which, for example, an extuded tube is expanded while hot to a dimensionally heat-unstable form but, in other applications, a preferred dimensionally heat unstable article is deformed to a dimensionally heat unstable form in a separate state.

Heat-recoverable articles based on fabrics are also known, and are described in GB-A-2,133,639, GB-A-2,133,740, GB-A-2,134,334, GB-A-2,135,632, GB-A-2,135,836 and GB-A-2,139,142, the disclosures of these documents are incorporated herein by reference. The assembly of the present invention may employ a fabric recoverable sleeve.

Wraparound recoverable sleeves have the advantage over tubular sleeves that they can be installed around an object without having to gain access to an end of the object. Known closures for wraparound sleeves include adhesives coated patches such as that disclosed in U.S. Pat. No. 4,200,676, and the so-called "rail and channel closure" disclosed in GB No. 1,155,470.

In the assembly of this invention, a resilient girdle is used as a closure for a wraparound recoverable sleeve.

Accordingly, in a first aspect, the invention provides an assembly for covering an object, which comprises a wraparound recoverable sleeve, and a resilient girdle provided with means for fastening opposite edge regions thereof together, thereby enabling the girdle to hold the sleeve in its wrapped configuration during recovery.

In another aspect, the invention provides a method of installing around an object a wraparound recoverable sleeve which is coated with an activatable adhesive, which comprises:

(a) wrapping the sleeve around the object;
(b) applying means for holding the sleeve in its wrapped configuration, the holding means being detachably connected to the sleeve;
(c) treating the sleeve to cause it to recover and to cause the adhesive to be activated;
(d) detaching the holding means from the sleeve, the activated adhesive holding the sleeve in its wrapped configuration By "detachably connected" is meant that the holding means is connected to the sleeve by means which are arranged to allow it to be detached after the activatable adhesive has been activated. The holding means may be connected to the sleeve by, for example, adhesive tape, cooperating hooks and eyes including Velcro TM tape, a channel member and cooperating rails on the sleeve and the holding means, press-studs etc. It is also envisaged that the holding means and the sleeve may be formed of a unitary construction, and the holding means arranged to be detached from the sleeve along a predetermined line of weakness.

In another aspect, the invention provides a method of covering an object, which comprises installing a wraparound recoverable sleeve around the object, installing a resilient girdle around the sleeve, and recovering the sleeve whilst the girdle holds the sleeve in its wrapped configuration.

By using a resilient girdle, it is possible to arrange that the girdle member is in tension when installed around the recoverable sleeve, and remains in tension during recovery, so that the girdle follows the recovery of the sleeve and holds the sleeve in compression during recovery. This helps to eliminate voids between the sleeve and the object, and between multiple wraps of the sleeve when used, while also maintaining the sleeve in its wrapped configuration.

In contrast to the rail and channel closure, and to other closures which involve cooperating formations on a recoverable sleeve, the girdle closure allows a recoverable sleeve to be used to cover objects with a range of sizes since the sleeve can be cut to an appropriate length without risk of cutting off one of the said formations. Moreover, a range of size of objects can be accomodated by varying the extent of overlap of the edge regions of the sleeve when it is wrapped around the object.

A substantial advantage of the use of a girdle to fasten a wraparound sleeve is that it can conveniently be used with a sleeve that is wrapped more than once around an object. Multiple wrapping has the advantage that thick-wall parts can be installed around an object, but that the sleeve from which the thick-wall part is flexible. The resilience in the girdle minimises void formation between the layers of the sleeve. Furthermore, the use of the girdle as a closure allows the number of turns of the sleeve around the object to be varied according to factors such as size of the object and the desired wall thickness. The increase in wall thickness resulting from multiple wrapping enables the assembly of the invention to withstand increased pressure, for example to seal objects such as gas pipes.

Preferably, the wraparound sleeve is provided with a closure member, at or adjacent to an edge region thereof, for engagement with the girdle. This allows the girdle to be used on a sleeve which has a recovery of more than 15% without slippage of the sleeve as it recovers.

When the sleeve recovers by less than 15%, it is possible to omit the closure member from the sleeve, and to rely on the tension of the girdle to hold the sleeve in place.

The closure member may take the form of a bar that is attached to the sleeve. In this case, the girdle may be provided with fastening means in the form of a buckle.

Alternatively, the girdle and sleeve may be fastened together by means of press-studs, hooks and eyes. It is also envisaged that the girdle member may be attached to the sleeve permanently, for example by means of an adhesive or by stitching. It is however an advantage of the assembly that it provides a closure for a recoverable sleeve that is reusable. As well as minimising cost, the removability of the girdle provides a sleeve with an advantageously low profile.

The recoverable sleeve will generally be coated with a layer of a sealing material, such as an adhesive or a sealant, for example a hot-melt adhesive, a curable adhesive or a mastic. It is particularly preferred to use an adhesive since once the adhesive has formed a bond, the girdle can be removed with minimal risk to the security of the sleeve.

The sleeve will preferably be heat-recoverable although other forms of recoverability are envisaged. When the sleeve is heat-recoverable, the girdle will generally be made of a material that is resistant to the heat generated during recovery of the sleeve.

The girdle may be provided with a layer of resiliently compressible material or of insulating material or both on an internal surface. A layer of a foam material can fulfil either or both of these functions. It is advantageous to incorporate a layer of resiliently compressible material into the girdle on its internal surface to promote even distribution of compressive force around the sleeve, and in particular at points of unevenness such as step-downs. A layer of thermally insulating material can ensure that the girdle is not affected adversely if the sleeve is heated to cause recovery. This is particularly advantageous if the girdle is to be reused.

When the sleeve is recoverable by the action of heat, heat may be supplied by means of a torch, a hot-air gun or by an electrical heater.

It is preferred that the sleeve be provided with an inbuilt heater. This may take the form of wire that follows a generally zig-zag path across the width of the sleeve. Such a sleeve is disclosed in European Pat. No. 158,519. An alternative heater than may be used is formed from a mesh provided with apertures which allow the mesh to change its dimensions by a change in the shape of the apertures. The in-built heater may also be provided by use of a conductive material for the sleeve. The provision of an in-built heater can reinforce the sleeve, enabling it to withstand higher pressures.

The use of an in-built heater finds particular advantage when the sleeve is to be wrapped more than once around an object, since it enables heat to be delivered uniformly through what is in effect a thickwall part, thus ensuring uniform recovery of the sleeve without scorching.

The girdle will preferably be of such length that it can encircle the installed sleeve completely. It will preferably be provided on opposite edges with means for fastening the girdle in its encircling configuration. The strength required of the fastening means will depend on the force exerted as a result of the resilience of the sleeve. Suitable fastening means include press-studs, hooks and eyes, buttons and button-holes, etc.

When the sleeve is wrapped more than once around the object, it is preferred that the first wrap of the sleeve be provided by a sheet of a sealing material, such as an adhesive or a sealant. The sheet of sealing material will be contiguous with a sheet of recoverable material, prior to installation of the sleeve. The sealing material of the sheet will preferably be the same as any sealing material that is provided as a coating on the sheet of recoverable material.

The provision of an inner layer of a sealing material ensures that there is an adequate amount of sealing material between the sleeve and the object. This can be advantageous since the inner edge of the recoverable sleeve is not restrained by the girdle from moving when the sleeve recovers. In the absence of sufficient adhesive, movement of the inner edge of the recoverable sleeve, thus can lead to the formation of an undesirable void extending perpendicular to the direction of recovery of the sleeve; such a void can in use provide a leak path.

It is preferred that the sheet of sealing material be reinforced; preferred reinforcing materials include fibrous materials, especially an open woven mesh of glass fibres, although powder reinforcing materials may also be used.

In addition to ensuring that voids that would result from creep-back of the inner edge of a recoverable wraparound sleeve are filled, it is also believed that the sheet of sealing material, as an inner layer of a multiply wrapped sleeve, can reduce the extent of such creep-back.

When the sleeve comprises a sheet of sealing material contiguous with a sheet of recoverable material, it is preferred that the sheet of sealing material provides the inner layer of the wrapped sleeve, and that one or more, preferably two, further layers be provided in the installed sleeve by the sheet of recoverable material (with its coating of sealing material if present).

Of the available sealing materials it is particularly preferred to use a hot-melt adhesive for the material of the sheet of sealing material. Suitable hot-melt adhesives are described in GB No. 1,588,721.

Thus in a further aspect, the present invention provides a recoverable wraparound sleeve for enclosing an object, which comprises a sheet of recoverable material and, contiguous therewith, a sheet of a sealing materials, arranged so that when the sleeve is wrapped around the object, the sheet of adhesive forms at least part of the inner layer of the installed sleeve, and the sheet of recoverable material forms the outer layer of the installed sleeve.

The assembly, method and sleeve of the present invention may be used with advantage in the sealing of joints between lengths of pipe such as gas pipes, water pipes, preinsulated pipes and the like. The material of the pipes may be metallic or polymeric, and sealing material on the recoverable sleeve will be selected accordingly.

A particular application of the present invention is in the sealing of joints between metallic substrates, in which there is a dielectric break at each joint. Reference may be made to application No. 07/024,286, filed contemporaneously herewith, now abandoned, entitled "Assembly and Method for Joining Elongate Substrates", which has a common declaration of priority with this application. The disclosure of that application is incorporated herein by reference.

Embodiments of the present invention will now be described by way of example with reference to the accompanying drawings, in which:

FIG. 3 shows a perspective view of another embodiment of a wraparound sleeve for use in the present invention about to be installed around a joint between two pipes;

FIG. 4 shows a recoverable wraparound sleeve in which a sheet of sealing material is provided contiguous with the sheet of recoverable material; and FIG. 5 shows the sleeve of FIG. 4 installed around a pipe.

Figure 1:
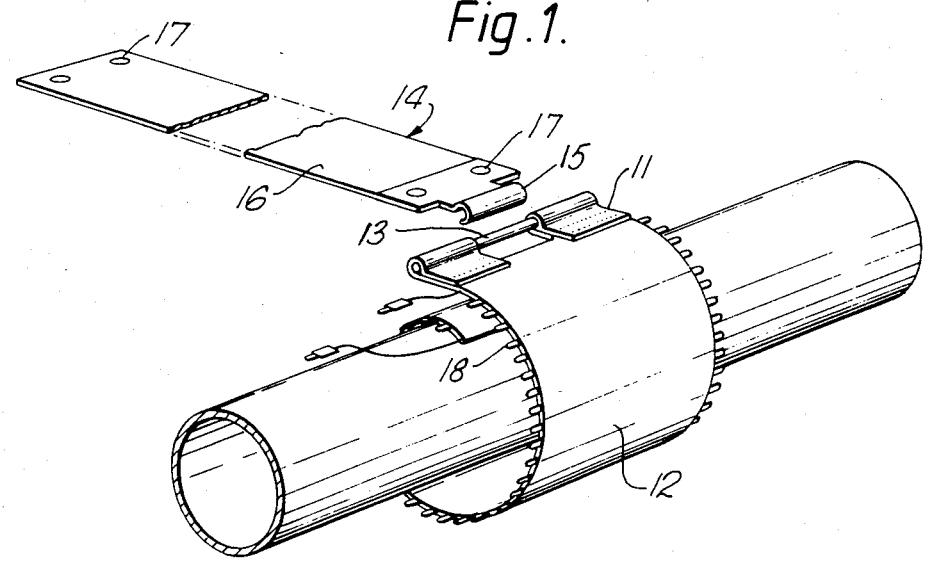
FIG. 1 shows a perspective view of a heat recoverable wraparound sleeve about to be installed around a joint between two pipes and a girdle about to be attached.
Figure 2:
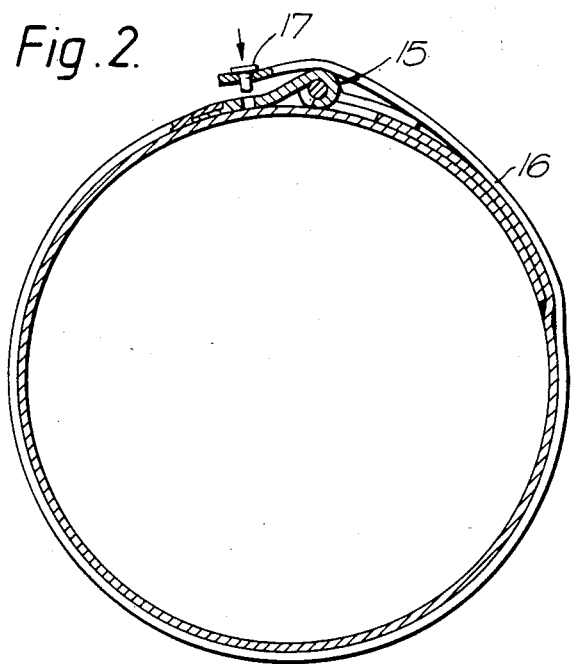
FIG. 2 shows the sleeve of FIG. 1 in sectional side elevation after recovery.

Referring to FIG. 1, a pair of straps 11 are attached by stitching to one end of a heat recoverable fabric wraparound sleeve 12 coated with a hot melt adhesive. The straps hold a bar 13 which acts as the closure member. A resilient girdle 14 comprises a metal buckle 15 and an elastic silicone rubber band 16. The girdle has fastening means 17 which, as shown in FIG. 2, comprise press-studs which lock together when the girdle 14 is placed around the heat recoverable sleeve 12. The sleeve is provided with an internal electric heating element 18.

When installing the sleeve, it is first wrapped around the joint with the sleeve end carrying the closure member overlapping the opposing plain sleeve end. The metal buckle 15 of the girdle 14 is then engaged with the bar 13 and the girdle pulled tight around the sleeve. The press-studs 17 can then be engaged to hold the girdle stretched around the sleeve. The electric heating element is then powered to heat the sleeve to its recovery temperature. During recovery, because the girdle 14 is stretched, it can follow the sleeve as it recovers and hold the sleeve tightly in its wrapped configuration. After recovery, the press-studs are released and the girdle removed. The sleeve remains in position, held by the hot melt adhesive.

Referring to FIG. 3, there is shown an alternative design in which the connection between the sleeve and the girdle is made by snap fasteners 21 and 22. The girdle is held around the sleeve in use by further snap fasteners 23 and 24. In this embodiment the girdle extends the full width of the sleeve and has a cut-away portion 25 to make it easier to stretch the girdle around the sleeve.

FIG. 4 shows a wraparound recoverable sleeve that comprises a sheet 30 of recoverable material coated with a layer of a hot-melt adhesive. Contiguous therewith is a sheet of hot-melt adhesive 34 reinforced with an open weave of glass fibres for providing the inner layer when the sleeve is wrapped around an object. The sleeve is provided with a heating element 36 in the form of a wire, with connection points 38. The heating element is sandwiched between the recoverable material and the hot-melt adhesive with which it is coated. The sleeve may be provided with a closure member for engagement with a girdle.

FIG. 5 shows the sleeve of FIG. 4 positioned around a pipe 50. The inner layer of the wrapped sleeve is provided by the sheet 34 of reinforced adhesive. The outer layer is provided by the laminate 30 of recoverable material and hot melt adhesive. The sheet of recoverable material is sufficiently long that edge region 58 overlaps edge region 60. For many applications, it will be preferred to provide a further layer of recoverable material in the wrapped sleeve. A girdle or other closure may be used to hold the sleeve in its wrapped configuration.

On supply of power to the heating element 36 (not shown in FIG. 5), the sleeve is caused to recover and the hot-melt adhesive is activated to bond to the pipe and the underlying layers of the sleeve. There can be a tendency for the edge region 60 of the sheet 30 to creep-back on recovery, anticlockwise as shown in FIG. 5. The sheet 34 of adhesive ensures that no void results from such creep-back.

We claim:

1. A method of covering an object which comprises:
   (a) multiwrapping a recoverable sleeve having closure means at one end around the object such that the closure is on the outside of the wrapped sleeve and whereby the amount of overlap is adjusted according to the size of the object to be covered;
   (b) detachably securing one end of a resilient girdle to the closure member on the sleeve and wrapping the girdle around the sleeve to maintain the sleeve in its wrapped configuration; and
   (c) recovering the sleeve;
   whereby the girdle holds each of the layers of the multiwrap tightly against each other and the object during recovery.

2. A method as claimed in claim 1, in which at least part of the first wrap of the sleeve is provided by a sheet of a sealing material.

3. A method as claimed in claim 1, wherein the girdle (i) is in tension immediately after it is wrapped around the sleeve and (ii) remains in tension during recovery of the sleeve.

4. A method as claimed in claim 3, wherein said tension is provided by stretching the girdle as it is wrapped around the sleeve.

5. A method in accordance with claim 1 which comprises the further step of removing the resilient girdle after recovery of the sleeve.

6. An assembly for covering an object, which comprises
   (a) a wraparound recoverable sleeve provided with a closure member at or towards an edge thereof; and
   (b) a resilient girdle having a securement means on one end which can be detachably connected to the closure member on the sleeve, and secured to itself when positioned around the sleeve to hold the sleeve in its wrapped configuration during recovery.

7. An assembly as claimed in claim 6, in which the sleeve is heat-recoverable and the girdle is formed from a heat resistant material.

8. An assembly as claimed in claim 6, in which the sleeve has an in-built electrical heater.

9. An assembly as claimed in claim 6, wherein the closure means on the sleeve and the securement means on the girdle are mating Velcro TM strips.

* * * * *